United States Patent

Makulla et al.

[11] Patent Number: 6,012,642
[45] Date of Patent: Jan. 11, 2000

[54] DRIVE MECHANISM FOR CONTROLLING A FLUID FLOW

[75] Inventors: Detlef Makulla, Overath; Peter Schulz, Bergisch Gladbach, both of Germany

[73] Assignee: H. Krantz - TKT GmbH, Bergisch Gladbach, Germany

[21] Appl. No.: 08/987,516

[22] Filed: Dec. 9, 1997

[30] Foreign Application Priority Data

Dec. 11, 1996 [DE] Germany ............................ 196 51 480

[51] Int. Cl.[7] .................................................. G05D 23/12
[52] U.S. Cl. ........................................ 236/49.5; 236/100
[58] Field of Search ................................. 236/49.5, 99 K, 236/100

[56] References Cited

U.S. PATENT DOCUMENTS

| 4,155,504 | 5/1979 | Caldwell | 236/100 |
| 4,883,082 | 11/1989 | Pirkle | 236/100 |
| 5,022,583 | 6/1991 | Bruens | 236/100 |
| 5,647,532 | 7/1997 | De Villiers et al. | 236/49.5 |

FOREIGN PATENT DOCUMENTS 59-49616  3/1984  Japan ................................. 236/101 D

*Primary Examiner*—William E. Tapolcai
*Attorney, Agent, or Firm*—W. F. Fasse; W. G. Fasse

[57] ABSTRACT

The cross-sectional flow area of a fluid duct and/or the flow direction of a fluid flow out of a fluid duct or air outlet is controlled by a control drive with two expansion drives positioned either in axial alignment with each other or with their longitudinal axis extending preferably in parallel to each other. The two drives are thermally separated from each other so that one drive is exposed to the temperature of one fluid while the other drive is exposed to the temperature of another fluid, whereby these fluids may be the same fluid or different fluids or mixture of different fluids. Each expansion drive contains a temperature responsive expansion material so that the power for operating the flow controller is derived solely from the temperature difference between the two fluids and hence any auxiliary energy becomes unnecessary for the control purpose. In both instances the control power is transmitted through a drive transmitter, for example in the form of a slide member or in the form of a balance beam.

14 Claims, 4 Drawing Sheets

DRIVE MECHANISM FOR CONTROLLING A FLUID FLOW

FIELD OF THE INVENTION

The invention relates to a drive mechanism for controlling a fluid flow, for example by varying the flow cross-sectional area in a valve, such as a gate or flap valve or the like, and/or by changing the flow direction. Both controls take place in response to a temperature difference between temperatures of two different fluids.

BACKGROUND INFORMATION

Fluid flow controllers of the type described above are known in the art and are used, for example in air technical structural components in climate control systems including air conditioning systems, for example in air flow ducts, air outlets and similar components, open loop or closed loop type for controlling flow volume and/or flow direction. These air technical components are simply referred to herein as components. Technical equipment in buildings comprises such components which must be controllable in response to the temperature of the air passing through the components on the one hand and in response to the temperature in a room or space into which the air passes through the components such as an air outlet. A suitable control value for the adjustment of the component or structural units comprising such components is frequently a temperature difference between the temperatures of the two fluids involved, e.g. hot air and cold air. Compared to the absolute temperature values, the temperature difference between these values is a substantially more important value for the climate control of a room because the temperature difference gives information whether the room is being heated or cooled. In case the temperature difference is positive, heating is involved. If the temperature difference is negative, cooling is involved.

In connection with air outlets such as air flow twister outlets installed in a ceiling and air source outlets or vortex outlets installed near the floor, it is necessary to vary the flow direction of the air discharge from the outlet depending whether the air has a temperature higher or lower than the temperature of the air in the room. The changing of the flow direction is necessary in order to meet modern comfort requirements, for example in order to divert a cold air flow away from customers or personnel. Such air flow control is also important for achieving an energy efficient climate control of an enclosed space. In connection with ceiling outlets, drafts must be avoided by diverting the cooled air horizontally along the ceiling so that the cold air may sink uniformly down to the floor. On the other hand, warm air must be blown downwardly for a rapid heat-up of the room. In connection with so-called air source outlets installed close to the floor, it is necessary to direct cooled air at an angle upwardly so that the cooled air can then at some distance from the outlet sink down to the floor again. In this manner it is possible for the added air to achieve a large reach without the need for large air exit velocities. Low air exit velocities are desirable for the replenishing of the air in a room with fresh air. However, if heated fresh air is to be introduced through an air source outlet, it is necessary to direct the heated air at an angle downwardly in order to heat the large heat storage mass of the floor on the one hand and to prevent an instantaneous rise of the warm air to the ceiling because such a rise substantially reduces the heating efficiency of the warm air.

Conventional heating control devices are generally equipped with two electric or electronic temperature sensors, one of which measures the room air temperature and the other measures the temperature of the fresh air. Depending on the temperature difference value, the control is effected generally with an electric motor or occasionally with a hydraulic or pneumatic drive functioning either as a volume flow closed loop controller or as an adjustment member for changing the flow direction of the air exiting from an outlet. Conventional adjustment mechanisms and their drive are relatively complicated and hence expensive because, on the one hand such closed loop control devices include a substantial number of structural components and require an expensive set of electrical conductors, including conductors for supplying energy to the controllers such as an electric motor for performing the adjustment.

Adjustment devices not requiring any additional energy for the control operation are also known. Such devices perform the adjustment of an adjustable component solely in response to the measured temperature of the fresh air. The adjustable component is operated by means of a single expansion drive arranged in the fresh air volume flow. Such an expansion drive position limits the response of the expansion drive to the temperature of the fresh air and the difference between the fresh air and the room temperature cannot be used for the purpose of flow control. The disadvantage of a single expansion drive is the fact that the same fresh air can have the same temperature for heating purposes and for cooling purposes. Thus, if in the example the fresh air temperature is 22° C. and it is assumed that a heating is required, it will be necessary to adjust the component of a ceiling twister or vortex outlet so that the fresh air is directed perpendicularly downwardly into the room having, for example a temperature of 18° C.

However, if the room temperature happens to be already 25° C., for example in the summer, the fresh air temperature will have the same temperature of 22° C., but a heating is not involved. Rather, a cooling is needed. Thus, if the adjustment of the exit flow direction depends solely on the temperature of the fresh air, the cooling air of 22° C. will again be directed perpendicularly downwardly, whereby drafts are generated in areas below the ceiling twister or vortex air outlets. Further, the temperature distribution throughout the room will vary widely with localized warm high temperature peaks near the ceiling. Actually required in such a case is a substantially horizontal flow direction of the cooled air along the ceiling to distribute the cooled air uniformly over the ceiling and thus over the room cross-sectional area to permit the cool fresh air to sink down uniformly throughout the room. Such an air distribution cannot be achieved with an adjustment by an expansion drive that is solely dependent on the fresh air temperature.

OBJECTS OF THE INVENTION

In view of the foregoing it is the aim of the invention to achieve the following objects singly or in combination:

to provide an expansion drive mechanism for a flow control such as a flap valve or gate valve or the like that can be operated without the supply of extra energy such as electricity or compressed air by utilizing the motion of at least two so-called expansion drives that respond to the temperature of the air flows in which these drives are positioned;

to provide a flow controller drive that is responsive to the temperature difference between two fluids to derive an adjustment motion from that temperature difference; and to avoid using an electronic control that under the operating conditions under which the present controls must work, such as in room climate controls are rather trouble-prone due to moisture and variable temperature conditions.

SUMMARY OF THE INVENTION

The above objects have been achieved according to the invention by the combination of two temperature responsive expansion drives, one of which is exposed to the temperature of a first fluid while the other is exposed to the temperature of a second fluid and both expansion drives are coupled through respective couplings to the same drive member which in turn operates a flow control. One expansion drive operates the drive member in one direction, while the other expansion drive operates the drive member in the opposite direction, whereby the effective control value is the temperature difference of the two fluids which may be fluids of the same kind or which may be different fluids or fluid mixtures.

Due to the fact that the energy for the control drive is taken directly from the heat content of the fluids involved, the drive of the invention is not dependent on any external power supply. The temperature responsive expansion drives rely solely on the mechanical expansion of a material such as wax, or wax mixtures or the like, and is thus independent of any trouble-prone electronic controls and also does not require any electrical cables.

Temperature responsive expansion drives comprise a cylinder partially filled with a special wax mixture positioned in the cylinder between one closed end thereof and a piston that is movable with its piston rod extending out of the other open end of the cylinder. The wax is rigidly secured to the closed end of the inner cylinder end wall and to one surface of the piston. The wax mixture is responsive to the temperature surrounding the cylinder. The defined volume of the wax mixture has a determined temperature response characteristic, whereby an increase in the temperature increases the volume of the wax and a decrease of the temperature reduces the volume of the wax. This volume change moves the piston with its piston rod back and forth, whereby the piston rod transmits the motion to a drive member. It is known to prepare various wax mixtures with due regard to the temperature range in which the particular wax mixture is intended to work.

According to the invention each of the two expansion drives is exposed to the temperature of one of the two fluids. As a result, the temperature difference is ascertained and used as the control value, whereby the adjustment of the drive member by one or the other expansion drive becomes in fact independent of the absolute prevailing temperature and the adjustment now responds to the temperature difference for the required change of the flow cross-sectional area and/or of the flow direction. More specifically, the temperature difference is measured because the two expansion drives are effective on the respective drive member and thus on the flow controller in opposite directions, whereby the driving force is a difference force representing the temperature difference. Thus, for example if both temperatures are equal, or rise equally, no controller position and/or flow direction adjustment takes place because there is no temperature difference.

According to a further embodiment of the invention the expansion drives are constructed to have a linear temperature response characteristic. For this purpose each coupling between the piston displaced by the respective expansion drive and the drive member for the flow controller includes a spring element, more specifically a compression spring element that can be changed in its effective length by the movement of the respective piston. As a result, the drive member coupled to both expansion drives will not move when the forces generated by the expansion drives are in equilibrium with each other. These forces are the spring forces of the springs exposed to the expansion drive. Preferably, both springs have the same spring constant and the same linear force displacement response characteristic. Hence, each spring will be compressed or shortened by the same length. Thus, the drive member which is responsive to both expansion drives, will always be positioned centrally between the spring ends remote from the drive member. Further, under these conditions the drive member will always be positioned centrally between the two pistons, provided that both piston rods have the same length. If both temperatures are the same, the arrangement is mirror-symmetrical relative to a central plane and this symmetry is only disturbed when the temperatures differ and the respective movement of the drive member is used for controlling or positioning a controllable flow controller or flow control.

Assuming that both temperatures are equal and that both temperatures rise equally, the two expansion drives will cause the two spring elements in the couplings to be shortened by the same extent. As a result, the drive element will not be displaced from its center position. This feature shows that the position of the drive element depends on the prevalence of a temperature difference and not on the measurement of absolute temperatures.

If, starting from a temperature equilibrium only the temperature of one fluid increases or decreases, thereby influencing only one of the two expansion drives, a displacement of the respective piston will take place and the drive element will accordingly be displaced, however only by 50% of the piston displacement of the respective expansion drive. This is so because the two spring elements undergo the same length change. Thus, if only one temperature of the two fluids involved changes, a difference temperature becomes effective, whereby the desired displacement of the drive element takes place.

According to a further embodiment of the invention, the two couplings and the drive member are housed in a common housing such as a pipe section having an elongated slot in its wall. The slot has a length corresponding to the displacement range of the drive member passing through that elongated slot so that the inner end of the drive member is coupled to the two coupling devices while the outer end of the drive member is linked to the controllable flow controller or flow control. The inner wall surface of the pipe section functions as a guide for the spring elements in the coupling and as a guide for the piston rod extending out of the respective expansion drive cylinder. This guide is effective perpendicularly to the motion direction. Further, the housing in the form of a pipe section or the like protects the couplings and the interior portion of the drive member against contamination.

According to a further embodiment of the invention the adjustment mechanism or rather the couplings, comprise a balance bar journalled at its center and connected to the respective expansion drives at its ends. The expansion drives are now so arranged that their longitudinal axes extend in parallel to each other and substantially perpendicularly to the length of the balance bar. The coupling springs are positioned with their longitudinal axis in alignment with the motion direction of the piston of the respective expansion drive for applying oppositely effective torque moments to the ends of the bar when the respective spring elements are shortened by a piston motion. The second embodiment of the invention employs the principle of a so-called torque moment balance in which the balance bar or beam is at rest when the applied torque moments are at an equilibrium with each other, more specifically when the sum of the applied torque moments is zero.

If it is desired that each of the two expansion drives exerts the same force on the balance bar, it is advantageous for this purpose to make the product of the spring constant and the spacing between the rotational axis of the journal of the balance bar and the point of force introduction into the balance bar equal on both sides of the balance bar journal. In such a construction of the present drive, equal temperature rises or equal temperature drops in both fluids cause equal piston displacements of the expansion drives as to direction and length of the displacement, whereby the absolute value of the torque moment difference is the same on both sides of the balance beam so that the equilibrium state remains unchanged. However, if the temperature of only one fluid changes, the balance beam is deflected out of its balance position, whereby both spring elements are changed by the same length, but in opposite directions. More specifically, one spring will be shortened while the other is lengthened by the same length. Thus, in the second embodiment again the drive system is responsive only to a temperature difference operating as the control value.

Rather than positioning the two expansion drives on one side of the balance beam, it is also possible to position one expansion drive on one side of the balance beam while positioning the other expansion drive on the opposite side of the beam. This arrangement increases the spacing between the expansion drives, thereby facilitating the thermal insulation of the two expansion drives or rather of the expansion materials in the drives from each other. More specifically, the positioning of a thermal insulation wall that is required in both instances may be facilitated if the two drives are positioned on opposite sides of the balance beam, rather than on the same side, depending on the particular space conditions that must be accommodated.

In still another embodiment of the invention the wall of a fluid duct may be used as the separator wall between the two expansion drives, whereby the duct wall is provided with a passage into which the drive is inserted in such a way that one of the expansion drives is positioned inside the flow duct, while the other expansion drive is positioned on the outside of the flow drive. In such an embodiment it may be advantageous to provide a cover for the expansion drive positioned outside of the duct to protect the outer expansion drive thermally against the fluid flowing out of the fluid flow duct in which the inner expansion drive is positioned, so that the outer expansion drive cannot be exposed to a fluid flow that may falsify its temperature response. Thus, each of the two expansion drives is exposed to the temperature to which it is intended to respond.

According to a further embodiment of the invention the response of the outer expansion drive to the temperature of the fluid to which the outer expansion drive is exposed can be enhanced by causing the respective fluid to flow around the outer expansion drive. This is achieved by a secondary inlet through the wall of the fluid flow duct for the first fluid, thereby providing a Venturi effect in that the fluid flowing inside the duct sucks in the fluid outside the duct, thereby causing the outside fluid to flow around the outside positioned expansion drive, whereby the heat exchange between the outer fluid and the outer expansion drive is significantly increased and the response time of the respective closed loop control is correspondingly reduced.

BRIEF DESCRIPTION OF THE DRAWINGS

In order that the invention may be clearly understood, it will now be described, in connection with an example embodiment of the invention with reference to the drawings, wherein.

DETAILED DESCRIPTION OF PREFERRED EXAMPLE EMBODIMENTS AND OF THE BEST MODE OF THE INVENTION

Figure 1:
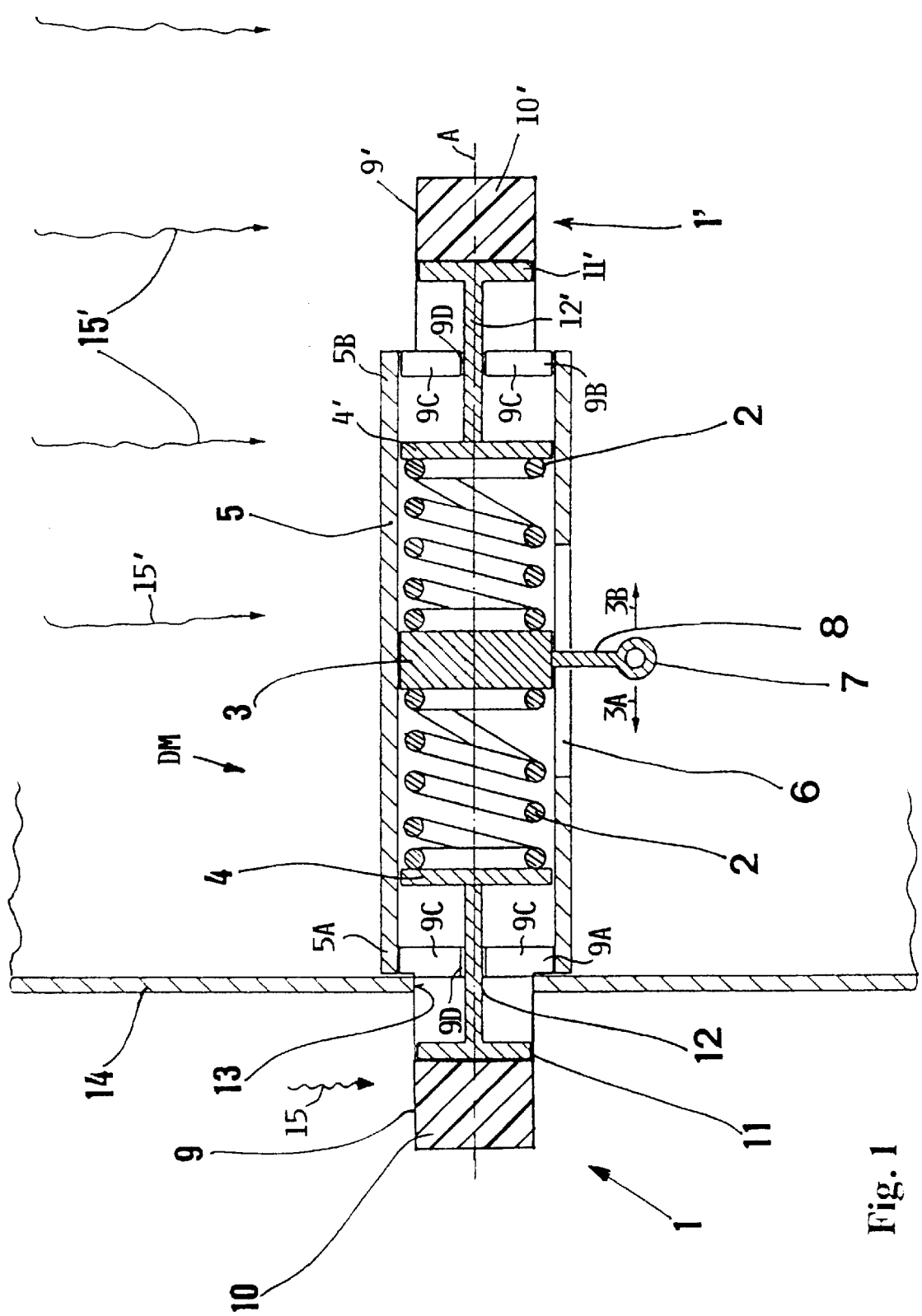
FIG. 1 shows a longitudinal section through a drive mechanism according to the invention with two expansion drives for the linear displacement of a drive member.

A drive mechanism DM according to the invention shown in FIG. 1 comprises two identical expansion drives 1 and 1' secured to opposite ends 5A and 5B of a housing 5. A driving force transmitter or drive member 3 is slidably guided inside the housing 5 for an axial back and forth movement as indicated by the arrows 3A and 3B. Couplings 2 and 2', preferably in the form of compression springs, are positioned and guided against lateral excursions inside the housing 5. One end of each coupling spring 2, 2' contacts a respective support plate 4, 4' secured to a corresponding piston rod 12, 12' of the corresponding drive 1, 1'. The other end of each coupling spring 2, 2' bears against the drive member 3. In the embodiment of FIG. 1, the expansion drives 1, 1', the housing 5, the piston rods 12, 12', the coupling springs 2, 2' and the drive transmitter 3 are axially aligned with each other relative to a central longitudinal axis A. The plates 4, 4' are also guided inside the housing 5 just as the springs 2, 2' and the drive transmitter or drive member 3 which has an extension 8 that reaches out of the housing 5 through an elongated slot 6 in its wall. The slot 6 has a length that limits the movements of the drive transmitter 3 and its extension 8 in the direction of the arrows 3A and 3B. The support plates 4 and 4' are so shaped or perforated that they provide venting through the housing 5 and the slot 6 of the cylinder section not filled with the expansion material.

Each of the expansion drives 1, 1' comprises a cylinder 9, 9' closed at its end away from the housing 5 and open at its opposite end facing into the housing. The cylinder 9 has a flange 9A at its open end. Similarly, the cylinder 9' has a flange 9B at its open end. These flanges 9A and 9B reach for example into the open ends 5A and 5B of the housing 5 to hold the respective cylinders in place. The flanges 9A, 9B are open except for spokes 9C that hold a central guide bushing 9D aligned with the central axis A for guiding the respective piston rod 12, 12' connected with one end to a piston 11, 11' and with the opposite end inside the housing 5 to the respective support plate 4, 4' for the coupling springs 2, 2'. Only a portion of each cylinder 9, 9' is filled with an expansion mass 10, 10' between the closed cylinder end and the respective piston 11, 11'. Such expansion mass may, for example be a special known wax mixture having a particular temperature expansion response characteristic. The wax mixture 10, 10' abuts against and is connected to the respective surface of the corresponding piston 11, 11' for driving the piston axially into the housing 5. The wax bears against and is connected to the closed end wall of the respective cylinder. Thus, when the wax contracts it can pull the piston into the respective cylinder.

Referring further to FIG. 1, the drive mechanism DM according to the invention is mounted to a wall 14 of a fluid duct not shown in further detail. The mounting is such, that the housing 5 and the expansion drive 1' with its cylinder 9' are inside the fluid duct and thus exposed to the temperature of a first fluid flow 15' inside the duct. The cylinder 9 of the other expansion drive 1 extends through a hole 13 in the wall 14 so that the other expansion drive 1 is positioned outside the fluid duct and thus exposed to the temperature of a second fluid 15. This arrangement of the present two expansion drives 1 and 1' in axial alignment with each other enables these drives to utilize a temperature difference between the first fluid 15' and the second fluid 15 for driving the drive transmitter or drive member 3 back and forth as will be described in more detail below.

If, for example the temperature of the first fluid 15' rises, such temperature rise causes the expansion of the wax content 10' in the cylinder 9' thereby pushing the piston 11' to the left in the direction of the arrow 3A. The piston rod 12' with its support plate 4' moves correspondingly to the left, thereby transmitting the leftward movement through the coupling spring 2' to the drive transmitter 3. Assuming that the temperature of the second fluid 15 outside the duct 14 remains unchanged, the displacement of the right-hand piston 11' with its support plate 4' will cause an axial displacement to the left of both spring elements 2 and 2' by a total displacement X so that each spring is displaced by 0.5 times X. Thus, the drive transmitter or drive member 3 is displaced by this amount 0.5 times X. Accordingly, as required, the adjustment or control motion of the drive member 3 corresponds to the temperature change of one fluid which in turn corresponds to the temperature difference between the two fluids.

On the other hand, if the two temperatures of the two fluids 15' and 15 rise or decrease by the same degree, the pistons will move in opposite directions with displacements of the same size. As a result, both coupling springs 2 and 2' will be compressed or expanded by the same amount so that the drive transmitter 3 retains its original position. This feature is also desirable because the displacement motion of the transmitter 3 shall take place only in response to a temperature difference between the temperatures of the two fluids 15 and 15'.

Figure 2:
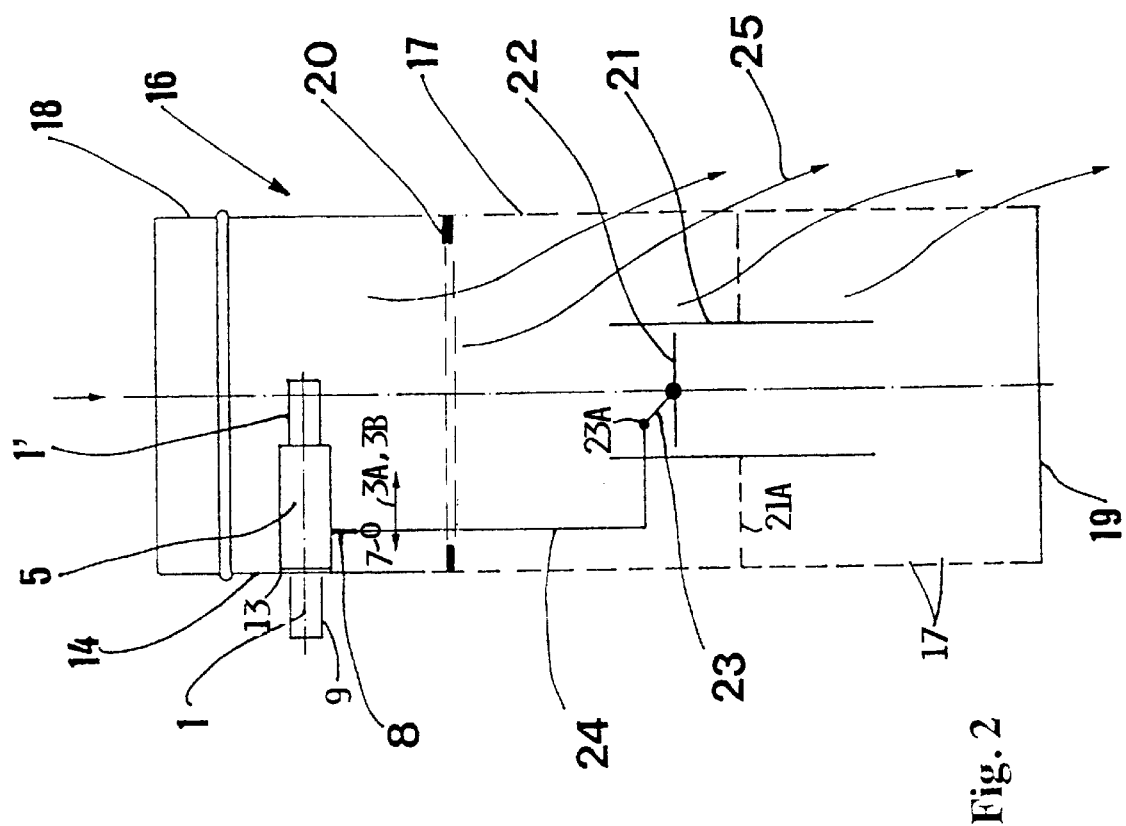
FIG. 2 shows schematically the position of a flow controller (22) when warm air is to be directed toward the floor of a room.

FIG. 2 shows schematically the installation of the present drive with its housing 5 in a flow duct 16 forming, for example a displacement air outlet. As in FIG. 1, the expansion drive 1, or rather the cylinder 9 thereof passes through a hole 13 in the wall 14 of the flow duct or air outlet 16. Such an outlet 16 is normally placed in a room near to or in the ceiling thereof, approximately three meters above the floor. The wall 14 of the duct 16 is provided with perforations 17 for the intended air flow. The upper end 18 of the air duct and outlet 16 is constructed for connection to a mounting not shown. The opposite end 19 is closed. Baffle rings 20 are mounted inside the perforated portion of the duct 16 for guiding the fluid flow 25. Only one such ring is shown. However, a plurality of rings 20 may be distributed along the length of the perforated housing portion of the duct 16. An open-ended pipe section 21 is mounted coaxially inside the duct 16, for example by a perforated mounting ring 21A. A flap valve 22 is journalled as a flow control inside the pipe section 21 for opening or closing the pipe section 21 in response to the driving force provided by the present drive mechanism. For this purpose, a lever 23 is rigidly connected to the flap valve 22. The lever in turn is pivoted by a pivot 23A to a drive link 24 which in turn is connected to the eyelet 7 of the transmitter extension 8. The connection of the drive link 24 to the eyelet 7 is a rigid connection so that the drive link 24 may move with the extension 8 as indicated by the double arrow 3A, 3B.

FIG. 2 illustrates a heating condition, whereby the flow 25 is hot air for heating a room. For this purpose the flap valve 22 is closed, thereby preventing fluid flow through the pipe section 21 and forcing the fluid flow through the perforations 17 approximately vertically downwardly toward the floor of a room to be heated as shown. The hot heating air has a temperature higher than the intended room temperature and can penetrate downwardly toward the floor area due to the flow characteristic imposed by the closed flap valve 22. The closed position is achieved because the expansion compound in the expansion drive 1' is exposed to the hot air and thereby expands sufficiently to move the drive transmitter extension 8 into its left-hand end position as determined by the length of the slot 6 shown in FIG. 1. The expansion material 10 of the left-hand drive 1 is exposed to a relatively low temperature and therefore does not expand under the assumed heating operation in FIG. 2.

Figure 3:
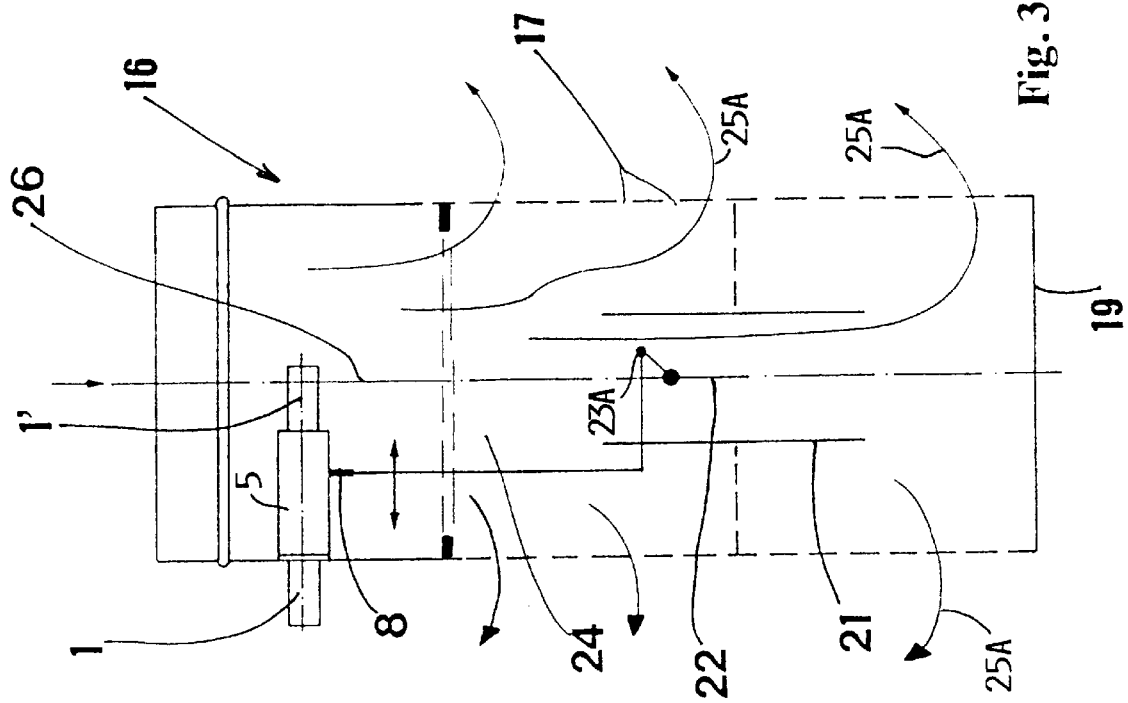
FIG. 3 is a view similar to that of FIG. 2, but illustrating the position of the flow controller when cool air is to be directed toward the ceiling of a room.

FIG. 3 illustrates the open position of the flap valve 22 as is the case when a cooling operation is required. Under this condition the interior expansion drive 1' is exposed to the cool temperature of the cooling air flow 25A while the external expansion drive 1 is exposed to the relatively warm room temperature. Under this operating condition the expansion material in the expansion drive 1 has been expanded while the expansion material in the interior drive 1' has contracted, whereby the transmitter extension 8 has assumed its right-end position again as determined by the slot 6 in the housing 5, whereby the flap valve 22 is driven into its open position in which the flap is aligned with the central axis 26 of the duct 16. The cross-sectional area of the pipe section 21 is now substantially fully open so that the flow 25A passing through the pipe section 21 is diverted laterally by the closed bottom 19 so as to pass through the perforations 17 upwardly toward the ceiling. As a result of this slanted upward flow of the fresh air or cooling air 25A, the latter is distributed uniformly along the ceiling around the outlet duct 16. Due to the uniform distribution along the ceiling of the room, the cool air, due to its larger density, sinks downwardly uniformly throughout the room. Such downward flow of the cool air takes place relatively slowly and results in an efficient cooling of the entire room, including areas near its floor.

Figure 4:
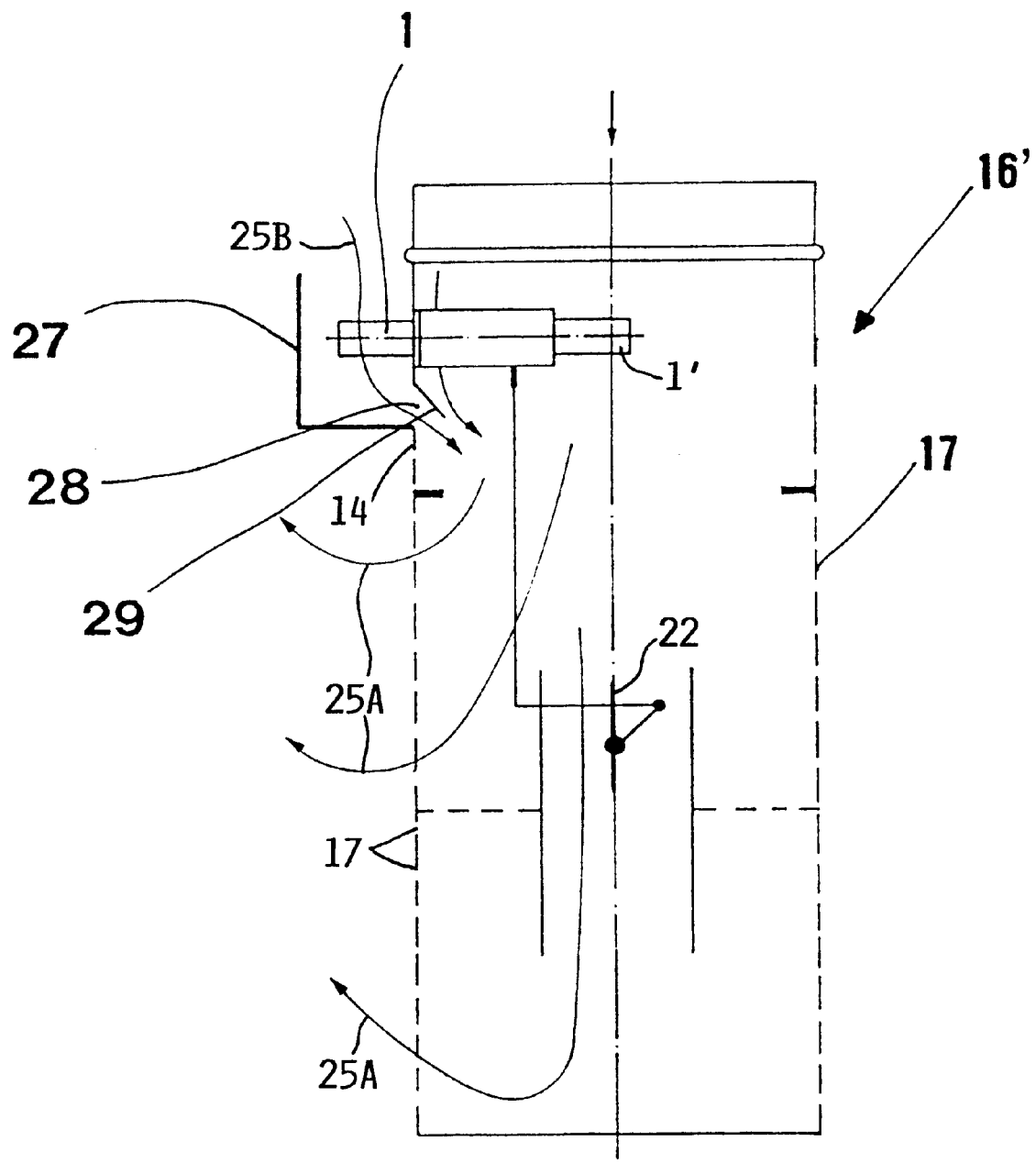
FIG. 4 is a view similar to that of FIG. 3 with the flow controller (22) in the open position and showing a cover (27) for the expansion drive positioned outside of a flow duct.

FIG. 4 shows a schematic view of a flow conduit 16' similar to that of FIG. 3 with the flap valve 22 in its open position representing a cooling condition. However, the flow conduit 16' of FIG. 4 has been modified by a cover 27 which is secured to the outside of the housing wall 14 of the flow duct or outlet 16' in such a position that it thermally protects the expansion drive 1 against the temperature of the flow 25A out of the apertures 17 in the housing of the duct 16'. This feature of the invention makes sure that erroneous temperature measurements with regard to the room temperature in the space surrounding the outlet 16' are avoided. A suction opening 28 is preferably provided in the wall 14 of the housing of the outlet 16' above the cover 27, but below the drive 1, whereby a Venturi suction fluid flow 25B that has room temperature must flow around the drive 1 into the outlet 16' due to the fluid flow 25A inside the outlet 16'. This Venturi suction flow 25B may be enhanced or amplified by a guide plate 29. The flow inside the outlet duct 16' is sufficient to cause a reduced pressure at the suction inlet 28 required for the Venturi action. This secondary or suction flow 25B has the advantage that it reduces the response time for the present drive mechanism.

Figure 5:
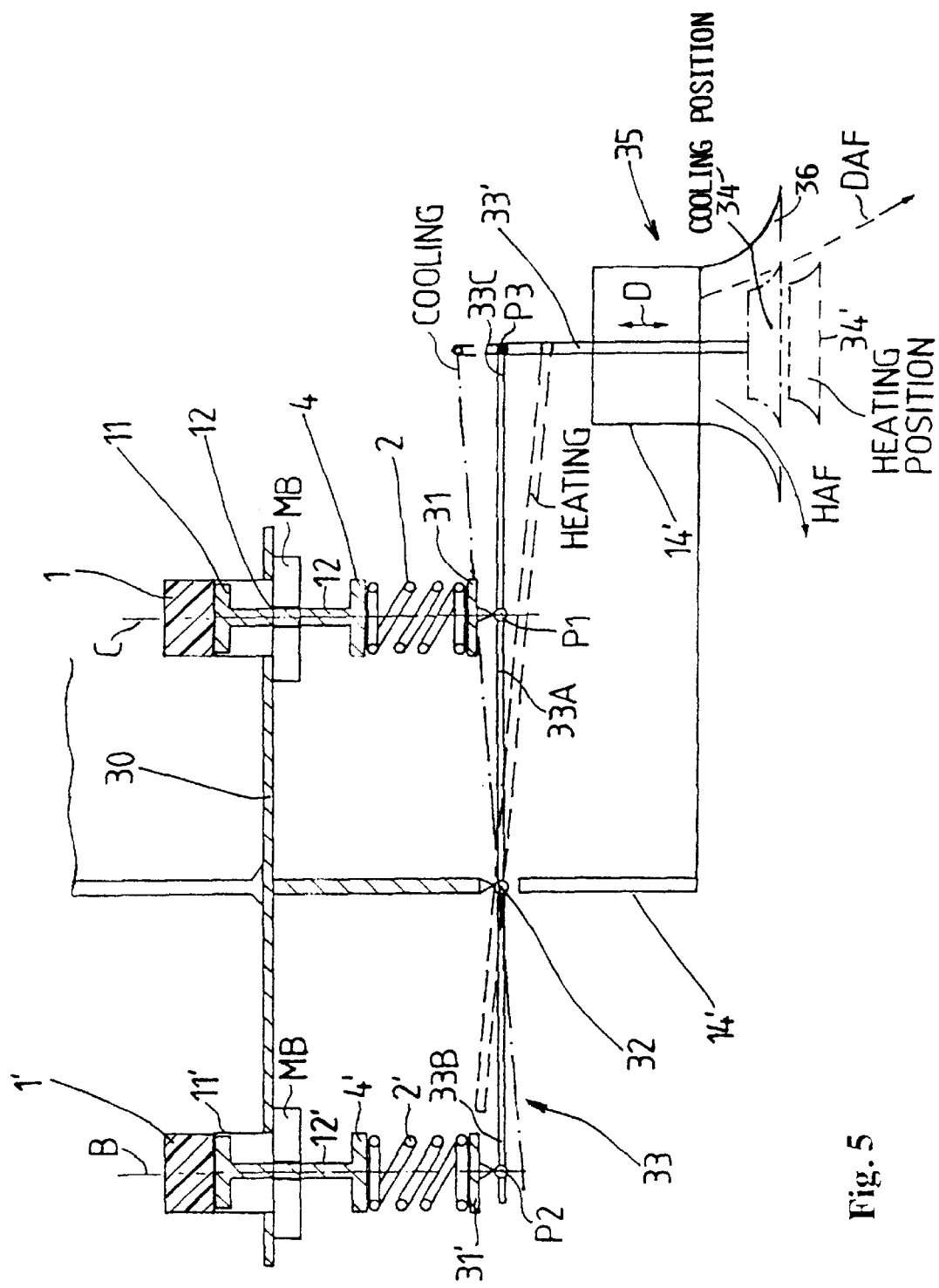
FIG. 5 illustrates a second embodiment of a drive according to the invention with a balance beam for operating a flow controller (34).

FIG. 5 illustrates a second embodiment of the present drive mechanism, wherein the two drives 1 and 1' are mounted on a common bracket 30 passing through a wall 14' of a flow duct 35 constructed as a ceiling outlet 14". The drive 1 is arranged inside the duct. The drive 1' is arranged outside the flow duct 35. This applies also to the respective couplings 2 and 2' and piston rods 12 and 12', as well as support plates 4 and 4'. The upper ends of the coupling springs 2, 2' bear against the downwardly facing surface of the support plates 4' while the lower spring ends rest on support plates 31, 31' respectively. The support plates 31, 31' are connected by pivots P1 and P2 respectively to a balance beam 33 having a journal 32, for example mounted in the wall 14' in such a way that the balance beam 33 can make the required clockwise or counterclockwise movement depending on the expansion and contraction of the expansion material in the two drives 1, 1'. The two drives are preferably of identical construction with identical spring constants in the coupling springs 2, 2' and with lever arms 33A, 33B of equal lengths between the journal 32 and the pivots P1 and the journal 32 and the pivot P2. This is not necessarily required if the expansion drives have different structural characteristics. The difference in the length of the lever arms will then accommodate the different characteristics of the expansion drives.

The illustration of the two drives 1 and 2' with their respective components in FIG. 5 is on a substantially larger scale than that of the air outlet 35. However, in fact, the drive is installed in the outlet 35 so that the large scale wall 14' and the small scale wall 14" of the air outlet 35 are in fact the same. This type of illustration helps explain the operation of the present expansion drive mechanism.

As shown in FIG. 5, the balance beam 33 has lever arms 33A and 33B of equal length but the arm 33A has an extension drive transmitter 33C pivoted by a pivot P3 to a drive link 33' slidably mounted coaxially in the housing of a twister or vortex ceiling outlet 35. A flow controller 34 is rigidly secured to the lower end of the drive link 33'. The controller 34 has a circumferential contour corresponding to the contour of an outlet collar 36 of the outlet 35, whereby the controller 34 in the dash-dotted line position shown, causes a substantially horizontal air-flow HAF exiting in parallel to the ceiling. On the other hand, the dashed line position 34' of the controller 34, the outflow is directed substantially downwardly toward the floor as a downward airflow DAF.

Referring further to FIG. 5, the two operating conditions of the second embodiment of the present drive will now be described. The horizontal full line position of the balance beam 33 represents a neutral position. The dash-dotted line of the balance beam 33 represents a cooling situation in which the cool air flows out of the outlet 35 as the substantially horizontal air flow HAF. The dashed line illustration represents a heating situation in which the hot air is discharged as the downward air flow DAF. In both situations the first drive 1 is exposed to the temperature of the fluid flowing in the outlet 35 and the second drive 1' is exposed to the room temperature outside the outlet 35.

In the cooling situation the flow controller 34 assumes the dash-dotted position, whereby its lower edge extends flush with the collar 36 of the outlet 35, whereby the outflowing horizontal air flow HAF flows along the ceiling so that the cooling air can then drop toward the floor throughout the volume of the room. In the cooling situation, the temperature of the cooling air in the outlet 35 is distinctly cooler than the room temperature to which the second drive 1' is exposed. Thus, the piston 11' of the outer drive 1' extends due to the expansion of the expansion material in the cylinder of the drive 1' with a larger stroke than the piston 11 of the drive 1 inside the outlet 35. Thus, the balance beam 33 assumes the cooling position in which it slightly rises from left to right as shown by the dash-dotted line in FIG. 5. However, since the two coupling springs 2 and 2' have identical spring constants, they will have the same compression or shortening of their axial length, whereby the same spring forces in combination with the lever arms 33A and 33B of equal length result in equal, but opposite directed torque moments about the journal 32 thereby raising the controller 34 into the dash-dotted cooling position.

In the heating situation on the other hand, the warm air in the outlet 35 will cause the expansion material in the cylinder of the drive 1 inside the outlet 35 to expand, whereby the balance beam 33 and the flow controller 34 assume the dashed line position 34'. In this position the warm air will move as the downward air flow DAF toward the floor of the room. In this situation the spring element 2 is shortened due to the extension of the piston 12 with its support plate 4. However, the spring 2' is also shortened by the same length but in the opposite direction so that the clockwise rotation of the beam 33 into the dashed line position 34' is achieved.

The horizontal cool air distribution and the downward hot air distribution is desired for an efficient cooling and heating because in the cooling situation the cool air can drop down throughout the room volume, while in the heating situation the downwardly directed warm air can uniformly rise throughout the volume of the room.

It should be also mentioned in connection with FIG. 5 that the mounting blocks MB provide the required venting of the cylinder portion that is not filled with the expansion material. These mounting blocks MB also provide a proper guiding of the respective piston rods 12, 12', for example by a guide hub held in the mounting blocks, for example by spokes not shown in detail.

Further, the two drives 1 and 1' are positioned in FIG. 5 above the balance beam 33. However, both drives 1, 1' could also be positioned below the balance beam and with a proper modification of the couplings, one drive could be positioned on one side, for example above the balance beam, while the other drive and its couplings could be positioned on the opposite side or below the balance beam.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A drive mechanism for controlling a fluid flow, comprising a thermally separating wall (14, 14'), a first temperature responsive expansion drive (1) positioned for exposure to a first temperature on one side of said thermally separating wall, a second temperature responsive expansion drive (1') positioned for exposure to a second temperature on the other side of said thermally separating wall, a flow control (22, 34), a driving force transmitter (3, 33) connected to said flow control, a first elastic, compressible coupling (2) connecting said driving force transmitter (3, 33) to said first expansion drive (1) for applying a first force from said first expansion drive (1) through said first elastic compressible coupling (2) to said driving force transmitter (3, 33), and a second elastic, compressible coupling (2') connecting said driving force transmitter (3, 33) to said second expansion drive (1') for applying a second force from said second expansion drive (1') through said second elastic compressible coupling (2') to said driving force transmitter (3, 33) so that said flow control is operable simultaneously in response to said first and second expansion drives by a difference force corresponding to a temperature difference between said first and second temperatures.

2. The drive mechanism of claim 1, wherein each of said first and second elastic, compressible couplings comprises a piston (4, 4') and a spring (2, 2') positioned between said first and second expansion drives (1, 1') and said drive transmitter (3) respectively on opposite sides of said drive transmitter (3) so that said drive transmitter (3) is displaceable for driving said flow control (22) by said difference force.

3. The drive mechanism of claim 2, wherein said spring and said piston are arranged in series with each other in a drive direction, and wherein said spring is a compression spring (2, 2') that can reduce and expand its length in response to an axially applied force.

4. The drive mechanism of claim 2, further comprising a housing (5) for movably holding said first and second couplings for movement axially in said housing, and a longitudinal slot (6) in said housing, said drive transmitter (3) having an extension (8) connected to said drive transmitter (3), said extension (8) extending through said longitudinal slot (6) out of said housing (5), and wherein said first and second temperature responsive expansion drives (1, 1') are mounted to said housing and through said couplings to said drive transmitter (3).

5. The drive mechanism of claim 4, wherein said first and second temperature responsive expansion drives are mounted to opposite ends of said housing, and further comprising a separation wall (14), said housing being connected to said separation wall.

6. The drive mechanism of claim 1, wherein said driving force transmitter (33) is a balance beam comprising two beam arms (33A, 33B) and a fixed journal (32) between said beam arms (33A, 33B) for a see-saw motion of said balance beam, said first elastic, compressible coupling connecting one beam arm (33A) to said first temperature responsive expansion drive (1), said second elastic, compressible coupling connecting the other beam arm (33B) to said second temperature responsive expansion drive (1') for applying to said balance beam torque moments having different directions.

7. The drive mechanism of claim 6, wherein each of said first and second couplings comprises a pivot (P1, P2) connecting the respective coupling to the corresponding end of said balance beam.

8. The drive mechanism of claim 7, wherein said balance beam (33) has one beam arm between said journal (32) and one pivot (P1), and another beam arm between said journal (32) and the other pivot (P2), and wherein each arm has the same length.

9. The drive mechanism of claim 7, wherein each of said first and second couplings comprises a compression spring (2, 2') having an axial length variable by said first and second drives (1, 1') respectively, and wherein each compression spring (2, 2') is connected to a respective pivot (P1, P2).

10. The drive mechanism of claim 1, wherein said thermally separating wall forms part of a fluid flow duct (16), and wherein one of said first and second temperature responsive expansion drives is mounted on one side of said wall outside said fluid flow duct, while the other temperature responsive expansion drive is mounted on the opposite side of said wall inside said fluid flow duct.

11. The drive mechanism of claim 10, further comprising a cover (27) at least partly enclosing said one temperature responsive expansion drive outside said fluid flow duct for thermally protecting or insulating said one drive against a fluid flow exiting from said fluid flow duct.

12. The drive mechanism of claim 11, wherein said fluid flow duct (16) comprises a suction inlet (28) positioned for flowing a fluid from outside said fluid flow duct (16) around one expansion drive outside said fluid flow duct into said fluid flow duct.

13. The drive mechanism of claim 9, wherein said first and second couplings are positioned on the same side of said balance beam.

14. The drive mechanism of claim 9, wherein said first and second couplings are positioned on opposite sides of said balance beam.

* * * * *